(12) United States Patent
Qian et al.

(10) Patent No.: US 12,021,776 B2
(45) Date of Patent: Jun. 25, 2024

(54) CHANNEL MEASUREMENT METHOD AND DEVICE

(71) Applicant: Honor Device Co., Ltd., Shenzhen (CN)

(72) Inventors: Feng Qian, Shenzhen (CN); Li Shen, Shenzhen (CN); Jian Wang, Shenzhen (CN); Xiaocui Li, Shenzhen (CN); Yifan Xue, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 373 days.

(21) Appl. No.: 17/436,766

(22) PCT Filed: Feb. 28, 2020

(86) PCT No.: PCT/CN2020/077065
§ 371 (c)(1),
(2) Date: Sep. 7, 2021

(87) PCT Pub. No.: WO2020/177615
PCT Pub. Date: Sep. 10, 2020

(65) Prior Publication Data
US 2022/0103322 A1 Mar. 31, 2022

(30) Foreign Application Priority Data
Mar. 7, 2019 (CN) .......................... 201910178271.9

(51) Int. Cl.
*H04B 7/0426* (2017.01)
*H04L 5/00* (2006.01)
*H04L 25/02* (2006.01)

(52) U.S. Cl.
CPC ......... *H04L 5/0048* (2013.01); *H04B 7/0426* (2013.01); *H04L 5/0053* (2013.01); *H04L 25/0226* (2013.01)

(58) Field of Classification Search
CPC ................ H04B 7/0426; H04B 7/0452; H04B 7/0617; H04L 5/0048; H04L 5/0051; H04L 5/0053; H04L 25/0224
(Continued)

(56) References Cited

U.S. PATENT DOCUMENTS 9,094,924 B2 7/2015 Noh
10,080,203 B2 9/2018 Lee et al.
(Continued)

FOREIGN PATENT DOCUMENTS

| AU | 2011235950 B2 | 4/2014 |
|---|---|---|
| CN | 105144776 A | 12/2015 |

(Continued)

*Primary Examiner* — Harun Chowdhury
(74) *Attorney, Agent, or Firm* — Slater Matsil, LLP

(57) ABSTRACT

Embodiments of this application disclose a channel measurement method and device. The method includes: receiving, by an access network device, a sounding reference signal (SRS) from a terminal device; receiving, by the access network device from the terminal device, a power adjustment factor used by first antenna ports, where the first antenna ports are antenna ports used by the terminal device to send a data signal; determining, by the access network device, a first uplink channel based on the SRS; and determining, by the access network device, a target channel based on the first uplink channel and the power adjustment factor used by the first antenna ports, where the target channel is a target uplink channel or a target downlink channel.

16 Claims, 6 Drawing Sheets

(58) Field of Classification Search
USPC .......................................... 370/252, 328, 329
See application file for complete search history.

(56) References Cited

U.S. PATENT DOCUMENTS

| | | | |
|---|---|---|---|
| 10,547,426 | B2 | 1/2020 | Papasakellariou |
| 11,012,948 | B2 | 5/2021 | Zhang et al. |
| 2013/0010744 | A1 | 1/2013 | Kang et al. |
| 2013/0272257 | A1 | 10/2013 | Takaoka et al. |
| 2014/0146863 | A1 | 5/2014 | Seol et al. |
| 2017/0034728 | A1 | 2/2017 | Zhang et al. |
| 2018/0069673 | A1* | 3/2018 | Soriaga ................ H04B 7/0452 |
| 2018/0343148 | A1 | 11/2018 | Hosseini et al. |
| 2018/0368078 | A1* | 12/2018 | Vintola ................ H04L 5/0048 |
| 2019/0068260 | A1 | 2/2019 | Yan et al. |

FOREIGN PATENT DOCUMENTS

| | | | |
|---|---|---|---|
| CN | 108365930 | A | 8/2018 |
| CN | 108781152 | A | 11/2018 |
| CN | 108848555 | A | 11/2018 |
| WO | 2017196612 | A1 | 11/2017 |
| WO | 2018176491 | A1 | 10/2018 |
| WO | 2018236826 | A1 | 12/2018 |

* cited by examiner

CHANNEL MEASUREMENT METHOD AND DEVICE

CROSS-REFERENCE TO RELATED APPLICATIONS

This application is a National Stage of International Application No. PCT/CN2020/077065, filed on Feb. 28, 2020, which claims priority to Chinese Patent Application No. 201910178271.9, filed with the China National Intellectual Property Administration on Mar. 7, 2019, which is hereby incorporated by reference in its entirety.

TECHNICAL FIELD

This application relates to the field of computer technologies, and in particular, to a channel measurement method and device.

BACKGROUND

Demand of modern wireless communication services for a channel capacity and communication performance of a communications system is always increasing. To further improve the channel capacity and the communication performance of the communications system, a person skilled in the art has proposed the concept of multiple input multiple output (multiple input multiple output, MIMO) communications system based on long term evolution (long term evolution, LTE) technologies. In the MIMO communications system, an access network device is provided with a plurality of transmit antennas, and a terminal device is provided with a plurality of receive antennas. A communication signal is sent and received by using the plurality of antennas of the access network device and the terminal device. Such a spatial multiplexing technology can make full use of space resources and implement multiple input multiple output by using a plurality of antennas. Without increasing spectrum resources and antenna transmit power, a channel capacity of the system can multiply, thereby improving communication performance.

At this stage, to further improve quality of the MIMO communications system, a beamforming technology is used in the MIMO communications system to process sent and received signals. To determine an appropriate beamforming weight, uplink and downlink channels during actual use of the MIMO communications system need to be measured. In a conventional technology, there are two methods for measuring the uplink and downlink channels of the MIMO communications system, and the two methods are described below.

In a conventional technology 1, the access network device configures a sounding reference signal (sounding references signal, SRS) for the terminal device. In a measurement process, the terminal device sends an SRS to the access network device based on information about the configured SRS, and the access network device then determines an uplink channel based on the received SRS, and determines a downlink channel based on the uplink channel and channel reciprocity.

The downlink channel measured in this manner is the same as the downlink channel during the actual use of the communications system. However, because the terminal device considers impact of an electromagnetic wave specific absorption rate (specific absorption rate, SAR) on a human body when sending a data signal, the terminal reduces signal power of the sent data signal. Consequently, the uplink channel measured by the access network device by using the sounding reference signal is different from the uplink channel during the actual use of the communications system.

If the terminal device has reduced power of the SRS according to an SAR requirement when sending the SRS, an uplink channel measured by the access network device based on the SRS with power reduced is the same as the uplink channel during the actual use of the communications system. However, the downlink channel is obtained based on the uplink channel, and for the downlink channel, power is not reduced based on an SAR. Therefore, the downlink channel measured in this manner is different from the downlink channel during the actual use of the communications system. It can be learned that in the conventional technology 1, there is a problem of inaccuracy of the measured uplink channel or downlink channel.

In a conventional technology 2, the access network device configures two SRSs for the terminal device. In a measurement process, the terminal device sends a first SRS to the access network device based on information about the configured first SRS, and the access network device can measure an accurate downlink channel based on the first SRS. Then the terminal device adjusts power of a second SRS according to an SAR requirement, and sends, to the access network device, the second SRS with powered reduced, and the access network device can measure an accurate uplink channel based on the second SRS with power reduced. However, because SRS air interface resources used for measurement in the MIMO communications system are strained, the method for configuring two sets of SRS resources severely wastes increasingly strained air interface resources and increases resource overheads.

Therefore, how to improve accuracy of channel measurement without increasing air interface resources is an urgent problem to be resolved by a person skilled in the art.

SUMMARY

Embodiments of this application provide a channel measurement method and device, to improve accuracy of channel measurement without increasing air interface resources.

According to a first aspect, an embodiment of this application provides a channel measurement method. The method includes: receiving, by an access network device receives a sounding reference signal SRS from a terminal device; receiving, by the access network device from the terminal device, a power adjustment factor used by first antenna ports, where the first antenna ports are antenna ports used by the terminal device to send a data signal; determining, by the access network device, a first uplink channel based on the SRS; and determining, by the access network device, a target channel based on the first uplink channel and the power adjustment factor used by the first antenna ports, where the target channel is a target uplink channel or a target downlink channel. Based on the method described in the first aspect, the access network device needs to configure only one SRS for the terminal device, and in a process of computing the target channel, the access network device considers impact, on channel measurement, of an SAR reduction operation on an antenna port used by the terminal device to send a data signal. Therefore, accuracy of channel measurement can be improved without increasing air interface resources.

With reference to the first aspect, in a possible implementation, a quantity of antennas for sending a data signal by the terminal is less than a quantity of antennas for receiving a data signal, the target channel is the target uplink channel, and the SRS includes a first SRS sent by the terminal device by using the first antenna ports; and the determining, by the access network device, a first uplink channel based on the SRS includes: determining, by the access network device, the first uplink channel based on the first SRS.

With reference to the first aspect, in a possible implementation, the SRS further includes a second SRS sent by the terminal device by using a second antenna port, and the second antenna port is an antenna port not used by the terminal device to send a data signal. The method further includes: determining, by the access network device, a second uplink channel based on the second SRS; and computing, by the access network device, the target downlink channel based on the first uplink channel and the second uplink channel.

With reference to the first aspect, in a possible implementation, the receiving, by the access network device from the terminal device, a power adjustment factor used by first antenna ports includes: receiving, by the access network device from the terminal device, a power adjustment factor used by a target antenna port in the first antenna ports, and a ratio of a power adjustment factor used by a third antenna port to the power adjustment factor used by the target antenna port, where the third antenna port is an antenna port other than the target antenna port in the first antenna ports. The determining, by the access network device, a target channel based on the first uplink channel and the power adjustment factor used by the first antenna ports includes: computing, by the access network device, the target channel based on the first uplink channel, the power adjustment factor used by the target antenna port, and the ratio.

With reference to the first aspect, in a possible implementation, a quantity of antennas for sending a data signal by the terminal is less than a quantity of antennas for receiving a data signal, the target channel is the target downlink channel, the SRS includes a first SRS sent by the terminal device by using the first antenna ports and a second SRS sent by the terminal device by using a second antenna port, and the second antenna port is an antenna port not used by the terminal device to send a data signal. The first uplink channel includes a second uplink channel and a third uplink channel, and the determining, by the access network device, a first uplink channel based on the SRS includes: determining, by the access network device, the second uplink channel based on the first SRS; and determining, by the access network device, the third uplink channel based on the second SRS. The determining, by the access network device, a target channel based on the first uplink channel and the power adjustment factor used by the first antenna ports includes: determining, by the access network device, a fourth uplink channel based on the second uplink channel and the power adjustment factor used by the first antenna ports; and determining, by the access network device, the target downlink channel based on the third uplink channel and the fourth uplink channel.

With reference to the first aspect, in a possible implementation, the method further includes: determining, by the access network device, the second uplink channel as the target uplink channel.

With reference to the first aspect, in a possible implementation, the receiving, by the access network device from the terminal device, a power adjustment factor used by first antenna ports includes: receiving, by the access network device from the terminal device, a power adjustment factor used by a target antenna port in the first antenna ports, and a ratio of a power adjustment factor used by a third antenna port to the power adjustment factor used by the target antenna port, where the third antenna port is an antenna port other than the target antenna port in the first antenna ports. The determining, by the access network device, a fourth uplink channel based on the second uplink channel and the power adjustment factor used by the first antenna ports includes: determining, by the access network device, the fourth uplink channel based on the second uplink channel, the power adjustment factor used by the target antenna port, and the ratio.

With reference to the first aspect, in a possible implementation, a quantity of antennas for sending a data signal by the terminal is equal to a quantity of antennas for receiving a data signal, the target channel is the target downlink channel, and the SRS includes a first SRS sent by the terminal device by using the first antenna ports. The determining, by the access network device, a first uplink channel based on the SRS includes: determining, by the access network device, the first uplink channel based on the first SRS. The determining, by the access network device, a target channel based on the first uplink channel and the power adjustment factor used by the first antenna ports includes: determining, by the access network device, a fifth uplink channel based on the first uplink channel and the power adjustment factor used by the first antenna ports; and determining, by the access network device, the target downlink channel based on the fifth uplink channel.

With reference to the first aspect, in a possible implementation, the receiving, by the access network device from the terminal device, a power adjustment factor used by first antenna ports includes: receiving, by the access network device from the terminal device, a power adjustment factor used by a target antenna port in the first antenna ports, and a ratio of a power adjustment factor used by a third antenna port to the power adjustment factor used by the target antenna port, where the third antenna port is an antenna port other than the target antenna port in the first antenna ports. The determining, by the access network device, a fifth uplink channel based on the first uplink channel and the power adjustment factor used by the first antenna ports includes: determining, by the access network device, the fifth uplink channel based on the first uplink channel, the power adjustment factor used by the target antenna port, and the ratio.

According to a second aspect, an embodiment of this application provides an access network device. The access network device includes a processor, a memory, and a communications interface. The memory is configured to store program instructions. The processor is configured to perform the following operations based on the program instructions: receiving a sounding reference signal SRS from a terminal device by using the communications interface; receiving, by using the communications interface from the terminal device, a power adjustment factor used by first antenna ports, where the first antenna ports are antenna ports used by the terminal device to send a data signal; determining a first uplink channel based on the SRS; and determining a target channel based on the first uplink channel and the power adjustment factor used by the first antenna ports, where the target channel is a target uplink channel or a target downlink channel. Based on the method described in the second aspect, the access network device needs to configure only one SRS for the terminal device, and in a process of computing the target channel, the access network device considers impact, on channel measurement, of an SAR reduction operation on an antenna port used by the terminal device to send a data signal. Therefore, accuracy of channel measurement can be improved without increasing air interface resources.

With reference to the second aspect, in a possible implementation, a quantity of antennas for sending a data signal by the terminal is less than a quantity of antennas for receiving a data signal, the target channel is the target uplink channel, and the SRS includes a first SRS sent by the terminal device by using the first antenna ports. The processor is specifically configured to determine the first uplink channel based on the first SRS.

With reference to the second aspect, in a possible implementation, the SRS further includes a second SRS sent by the terminal device by using a second antenna port, and the second antenna port is an antenna port not used by the terminal device to send a data signal. The processor is further configured to: determine a second uplink channel based on the second SRS; and compute the target downlink channel based on the first uplink channel and the second uplink channel.

With reference to the second aspect, in a possible implementation, the processor is specifically configured to: receive, by using the communications interface from the terminal device, a power adjustment factor used by a target antenna port in the first antenna ports, and a ratio of a power adjustment factor used by a third antenna port to the power adjustment factor used by the target antenna port, where the third antenna port is an antenna port other than the target antenna port in the first antenna ports; and compute the target channel based on the first uplink channel, the power adjustment factor used by the target antenna port, and the ratio.

With reference to the second aspect, in a possible implementation, a quantity of antennas for sending a data signal by the terminal is less than a quantity of antennas for receiving a data signal, the target channel is the target downlink channel, the SRS includes a first SRS sent by the terminal device by using the first antenna ports and a second SRS sent by the terminal device by using a second antenna port, and the second antenna port is an antenna port not used by the terminal device to send a data signal. The first uplink channel includes a second uplink channel and a third uplink channel, and the processor is specifically configured to: determine the second uplink channel based on the first SRS; determine the third uplink channel based on the second SRS; determine a fourth uplink channel based on the second uplink channel and the power adjustment factor used by the first antenna ports; and determine the target downlink channel based on the third uplink channel and the fourth uplink channel.

With reference to the second aspect, in a possible implementation, the processor is further configured to determine the second uplink channel as the target uplink channel.

With reference to the second aspect, in a possible implementation, the processor is specifically configured to: receive, from the terminal device, a power adjustment factor used by a target antenna port in the first antenna ports, and a ratio of a power adjustment factor used by a third antenna port to the power adjustment factor used by the target antenna port, where the third antenna port is an antenna port other than the target antenna port in the first antenna ports; and determine the fourth uplink channel based on the second uplink channel, the power adjustment factor used by the target antenna port, and the ratio.

With reference to the second aspect, in a possible implementation, a quantity of antennas for sending a data signal by the terminal is equal to a quantity of antennas for receiving a data signal, the target channel is the target downlink channel, and the SRS includes a first SRS sent by the terminal device by using the first antenna ports. The determining, by the access network device, a first uplink channel based on the SRS includes: determining, by the access network device, the first uplink channel based on the first SRS. The determining, by the access network device, a target channel based on the first uplink channel and the power adjustment factor used by the first antenna ports includes: determining, by the access network device, a fifth uplink channel based on the first uplink channel and the power adjustment factor used by the first antenna ports; and determining, by the access network device, the target downlink channel based on the fifth uplink channel.

With reference to the second aspect, in a possible implementation, the receiving, by the access network device from the terminal device, a power adjustment factor used by first antenna ports includes: receiving, by the access network device from the terminal device, a power adjustment factor used by a target antenna port in the first antenna ports, and a ratio of a power adjustment factor used by a third antenna port to the power adjustment factor used by the target antenna port, where the third antenna port is an antenna port other than the target antenna port in the first antenna ports. The determining, by the access network device, a fifth uplink channel based on the first uplink channel and the power adjustment factor used by the first antenna ports includes: determining, by the access network device, the fifth uplink channel based on the first uplink channel, the power adjustment factor used by the target antenna port, and the ratio.

According to a third aspect, an embodiment of this application provides an access network device. The access network device includes a receiving unit and a determining unit. The receiving unit is configured to receive a sounding reference signal SRS from a terminal device. The receiving unit is further configured to receive, from the terminal device, a power adjustment factor used by first antenna ports, where the first antenna ports are antenna ports used by the terminal device to send a data signal. The determining unit is configured to determine a first uplink channel based on the SRS. The determining unit is further configured to determine a target channel based on the first uplink channel and the power adjustment factor used by the first antenna ports, where the target channel is a target uplink channel or a target downlink channel. Based on the method described in the third aspect, the access network device needs to configure only one SRS for the terminal device, and in a process of computing the target channel, the access network device considers impact, on channel measurement, of an SAR reduction operation on an antenna port used by the terminal device to send a data signal. Therefore, accuracy of channel measurement can be improved without increasing air interface resources.

With reference to the third aspect, in a possible implementation, a quantity of antennas for sending a data signal by the terminal is less than a quantity of antennas for receiving a data signal, the target channel is the target uplink channel, and the SRS includes a first SRS sent by the terminal device by using the first antenna ports. The determining unit is specifically configured to determine the first uplink channel based on the first SRS.

With reference to the third aspect, in a possible implementation, the SRS further includes a second SRS sent by the terminal device by using a second antenna port, and the second antenna port is an antenna port not used by the terminal device to send a data signal. The determining unit is further configured to: determine a second uplink channel based on the second SRS by the access network device; and compute the target downlink channel based on the first uplink channel and the second uplink channel by the access network device.

With reference to the third aspect, in a possible implementation, the receiving unit is specifically configured to receive, from the terminal device, a power adjustment factor used by a target antenna port in the first antenna ports, and a ratio of a power adjustment factor used by a third antenna port to the power adjustment factor used by the target antenna port, where the third antenna port is an antenna port other than the target antenna port in the first antenna ports. The determining unit is specifically configured to compute the target channel based on the first uplink channel, the power adjustment factor used by the target antenna port, and the ratio.

With reference to the third aspect, in a possible implementation, a quantity of antennas for sending a data signal by the terminal is less than a quantity of antennas for receiving a data signal, the target channel is the target downlink channel, the SRS includes a first SRS sent by the terminal device by using the first antenna ports and a second SRS sent by the terminal device by using a second antenna port, and the second antenna port is an antenna port not used by the terminal device to send a data signal. The first uplink channel includes a second uplink channel and a third uplink channel, and the determining unit is specifically configured to: determine the second uplink channel based on the first SRS; determine the third uplink channel based on the second SRS; determine a fourth uplink channel based on the second uplink channel and the power adjustment factor used by the first antenna ports; and determine the target downlink channel based on the third uplink channel and the fourth uplink channel.

With reference to the third aspect, in a possible implementation, the determining unit is further configured to determine the second uplink channel as the target uplink channel.

With reference to the third aspect, in a possible implementation, the receiving unit is specifically configured to receive, from the terminal device, a power adjustment factor used by a target antenna port in the first antenna ports, and a ratio of a power adjustment factor used by a third antenna port to the power adjustment factor used by the target antenna port, where the third antenna port is an antenna port other than the target antenna port in the first antenna ports. The determining unit is specifically configured to determine the fourth uplink channel based on the second uplink channel, the power adjustment factor used by the target antenna port, and the ratio.

With reference to the third aspect, in a possible implementation, a quantity of antennas for sending a data signal by the terminal is equal to a quantity of antennas for receiving a data signal, the target channel is the target downlink channel, and the SRS includes a first SRS sent by the terminal device by using the first antenna ports. The determining unit is specifically configured to determine the first uplink channel based on the first SRS; determine a fifth uplink channel based on the first uplink channel and the power adjustment factor used by the first antenna ports; and determine the target downlink channel based on the fifth uplink channel by the access network device.

With reference to the third aspect, in a possible implementation, the receiving unit is specifically configured to receive, from the terminal device, a power adjustment factor used by a target antenna port in the first antenna ports, and a ratio of a power adjustment factor used by a third antenna port to the power adjustment factor used by the target antenna port, where the third antenna port is an antenna port other than the target antenna port in the first antenna ports. The determining unit is specifically configured to compute the fifth uplink channel based on the first uplink channel, the power adjustment factor used by the target antenna port, and the ratio.

According to a fourth aspect, an embodiment of this application provides a computer-readable storage medium. The computer storage medium stores program instructions. When the program instructions are run by a processor, the processor performs the method according to any one of the first aspect or the possible implementations of the first aspect.

According to a fifth aspect, an embodiment of this application provides a computer program. When the computer program is run on a processor, the processor performs the method according to any one of the first aspect or the possible implementations of the first aspect.

In the embodiments of this application, the access network device configures one SRS for the terminal device, and in a target channel measurement process, first, the access network device receives, from the terminal device, the sounding reference signal SRS, and the power adjustment factor used by the antenna ports that are used by the terminal device to send a data signal. Then, the access network device may determine the first uplink channel based on the SRS; and determine the target channel based on the first uplink channel and the power adjustment factor, where the target channel is the target uplink channel or the target downlink channel. It can be learned that the access network device needs to configure only one SRS for the terminal device, and in a process of computing the target channel, the access network device considers impact, on channel measurement, of an SAR reduction operation on an antenna port used by the terminal device to send a data signal. Therefore, in this application, accuracy of channel measurement can be improved without increasing air interface resources.

BRIEF DESCRIPTION OF THE DRAWINGS

To describe the technical solutions in the embodiments of this application or the conventional technology more clearly, the following briefly describes the accompanying drawings required for describing the embodiments or the conventional technology.

DETAILED DESCRIPTION OF ILLUSTRATIVE EMBODIMENTS

The technical solutions in the embodiments of this application are described below with more details with reference to the accompanying drawings.

Figure 1:
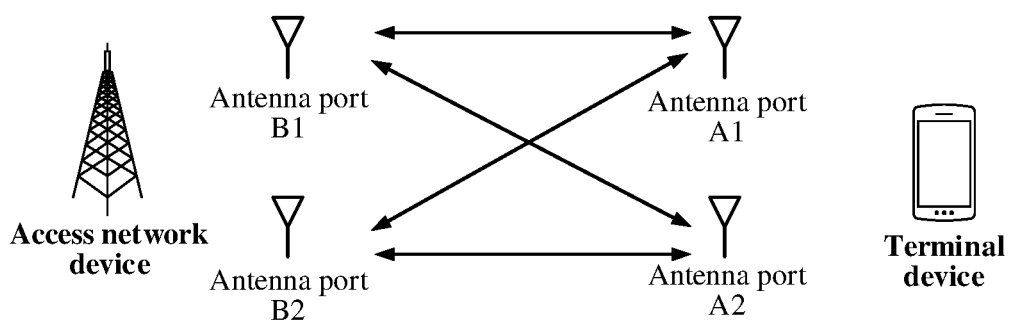
FIG. 1 is a schematic diagram of a system architecture for channel measurement according to an embodiment of this application.

FIG. 1 is a schematic diagram of a system architecture for channel measurement according to an embodiment of this application. The system includes an access network device and a mobile terminal. The two devices are described in detail below.

The access network device may communicate with a terminal device located in a coverage area of the access network device. The access network device may support communication protocols of different standards, or may support different communication modes. For example, the access network device may be an evolved NodeB (evolutional node B, eNB or eNodeB) in an LTE system, or a radio network controller in a cloud radio access network (cloud radio access network, CRAN), or may be an access network device in a 5G network, such as a gNB, or may be a small cell, a micro cell, or a transmission reception point (transmission reception point, TRP), or may be a relay station, an access point, an access network device in an evolved public land mobile network (public land mobile network, PLMN) in future, or the like. In the embodiments of this application, the access network device uses a communications technology of time division duplex (time division duplex, TDD). In a MIMO communications system in a TDD mode, a received signal and a sent signal are in different slots of a same frequency channel. An uplink channel and a downlink channel are separated by time, and the uplink channel and the downlink have reciprocity.

The terminal device may be an access terminal, user equipment (user equipment, UE), a subscriber unit, a subscriber station, a mobile station, a mobile console, a remote station, a remote terminal, a mobile terminal, a user terminal, a terminal, a wireless communications device, a user agent, or a user apparatus. The access terminal may be a cellular phone, a cordless phone, a session initiation protocol (session initiation protocol, SIP) phone, a wireless local loop (wireless local loop, WLL) station, a personal digital assistant (personal digital assistant, PDA), a handheld device or a computing device having a wireless communication function, another processing device connected to a wireless modem, a vehicle-mounted device, a wearable device, a terminal device in an internet of things, a virtual reality device, a terminal device in a 5th generation (fifth generation, 5G) network, a terminal device in an evolved public land mobile network (public land mobile network, PLMN) in future, or the like. In some possible implementations, the terminal device may be a wearable device. The wearable device may also be referred to as a wearable smart device, which is a general term for wearable devices that are intelligently designed from daily wearables and developed by applying wearable technologies. In the embodiments of this application, the terminal device considers impact of electromagnetic radiation on a human body when sending a data signal. When power of some antenna ports, for sending a data signal, of the terminal device exceeds a preset threshold, the transmit power of these antenna ports are restricted to the preset threshold. Such an operation of adjusting power of an antenna port according to a requirement of an electromagnetic wave specific absorption rate is also referred to as an operation of reducing the electromagnetic wave specific absorption rate, which is referred to as an SAR reduction operation for short.

To help understand this application, related technical knowledge of the embodiments of this application is first described herein.

The electromagnetic wave specific absorption rate (specific absorption rate, SAR) may also be referred to as an electromagnetic wave specific absorption ratio, and represents electromagnetic power of a terminal device absorbed or consumed per unit mass by a human body, and a unit is W/kg (watts/kilogram). The SAR can be used to measure impact of electromagnetic waves on a human body. A larger SAR value indicates greater impact of electromagnetic waves generated by a terminal device on a human body. Conversely, a smaller SAR value indicates less impact of electromagnetic waves generated by a terminal device on a human body. Speaking popularly, measuring an SAR of a terminal device means measuring whether impact of mobile phone radiation on a human body meets a standard. A current international standard is that electromagnetic radiation energy absorbed by each kilogram of brain tissue shall not exceed 2 watts in a measured period of 6 minutes. This standard serves as a common standard in the international industry.

For an SRS signal, a sending time of the SRS is relatively short. Whether to perform an SAR reduction operation on an antenna port for transmitting an SRS signal may be chosen. However, for a data signal, the data signal is sent for a long time, which has relatively greater impact on a human body. To reduce impact of electromagnetic waves on a human body, the SAR reduction operation is performed on an antenna port, for transmitting a data signal, of the terminal device. For the SAR reduction operation, because positions of antenna ports configured on the terminal device for transmitting data are different, additionally as a posture of a user using the terminal device changes, distances between the antenna ports for transmitting data and a human body are different. Therefore, SARs detected for the antenna ports for transmitting data are different, and further, different power values need to be adjusted for the antenna ports for transmitting data.

Figure 2:
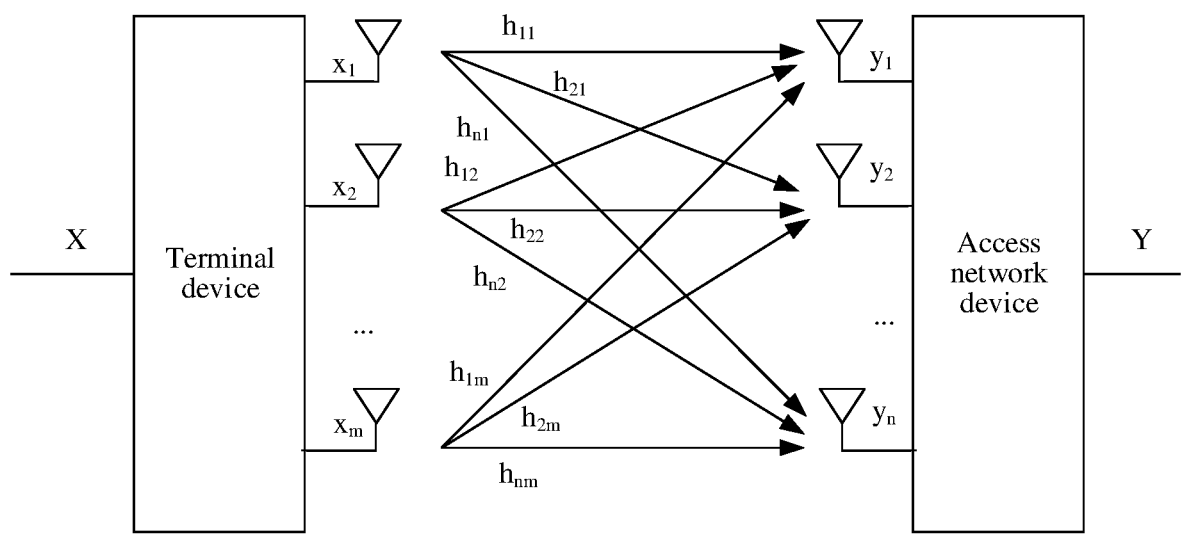
FIG. 2 is a schematic diagram of a MIMO communications system according to an embodiment of this application.

The following describes channels in the MIMO communications system. FIG. 2 is a schematic diagram of a MIMO communications system according to an embodiment of this application. X is a sent signal, and Y is a received signal. A terminal device in the MIMO communications system is provided with m transmit antennas, which are $x_1, x_2, \ldots,$ and $x_m$ respectively. The access network device is provided with n receive antennas, which are $y_1, y_2, \ldots,$ and $y_n$, respectively.

$h_{ij}$ (i=1, 2, . . . , n, and j=1, 2, . . . , m) means a channel coefficient between a $j^{th}$ transmit antenna and an $i^{th}$ receive antenna. The channel coefficient includes a link loss and/or a phase change. In this case, an uplink channel $H_{UL}$ in the MIMO communications system may be shown in Formula 1-1:

$$H_{UL} = \begin{bmatrix} h_{11} & h_{12} & \ldots & h_{1m} \\ h_{21} & h_{22} & \ldots & h_{2m} \\ \ldots & \ldots & \ldots & \ldots \\ h_{n1} & h_{n2} & \ldots & h_{nm} \end{bmatrix} \quad 1\text{-}1$$

For a MIMO communications system using a communications technology of TDD, the uplink channel and a downlink channel have reciprocity. The downlink channel $H_{DL}$ may be obtained based on the uplink channel $H_{UL}$. The downlink channel $H_{DL}$ may be shown in Formula 1-2:

$$H_{DL} = (H_{UL})^T = \begin{bmatrix} h_{11} & h_{21} & \ldots & h_{m1} \\ h_{12} & h_{22} & \ldots & h_{m2} \\ \ldots & \ldots & \ldots & \ldots \\ h_{1n} & h_{2n} & \ldots & h_{mn} \end{bmatrix} \quad 1\text{-}2$$

The following further describes a channel measurement method and related devices provided in this application.

Figure 3:
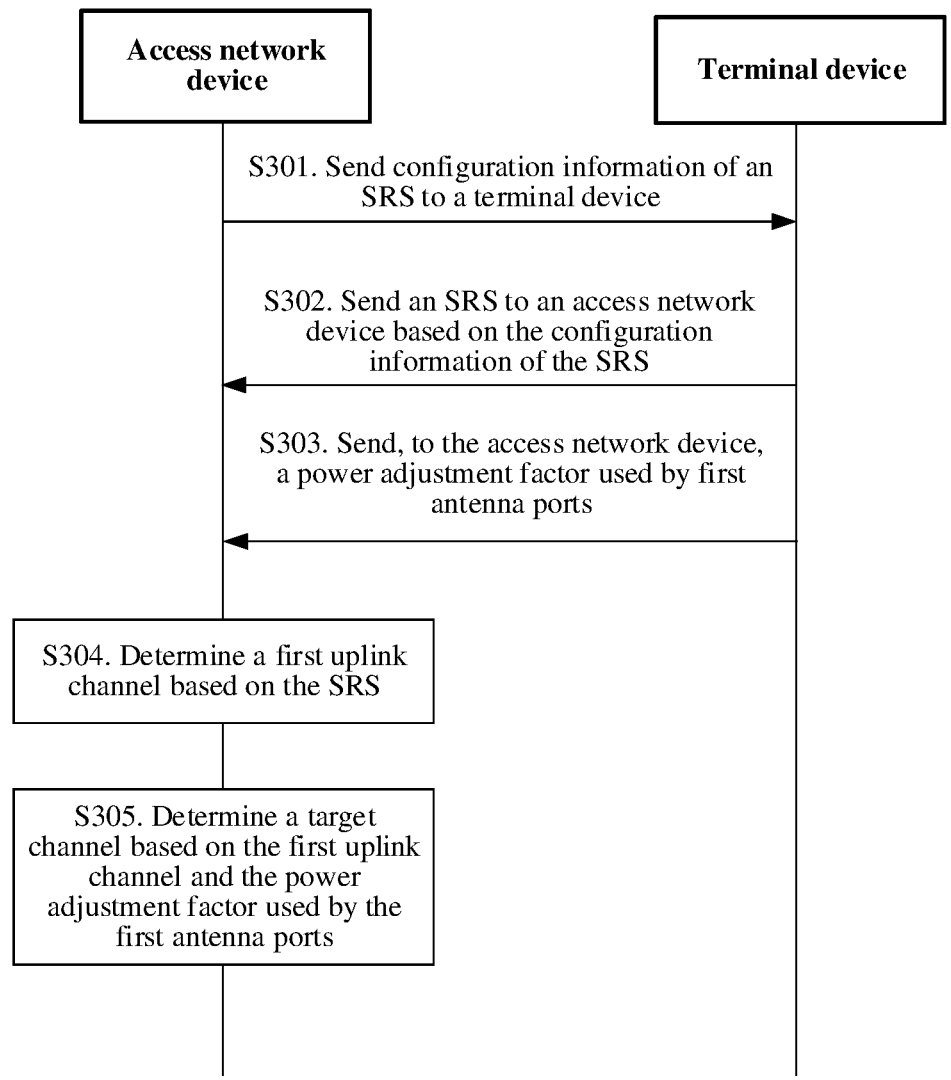
FIG. 3 is a flowchart of a channel measurement method according to an embodiment of this application.

FIG. 3 is a flowchart of a channel measurement method according to an embodiment of this application. The method may be implemented based on the architecture shown in FIG. 1. An access network device described below may be the access network device in the system architecture shown in FIG. 1. A terminal device described below may be the terminal device in the system architecture shown in FIG. 1. The method includes but is not limited to the following steps.

S301. The access network device sends configuration information of an SRS to the terminal device.

Optionally, the access network device sends configuration information of one SRS to the terminal device by using higher layer signaling. For example, the higher layer signaling may be radio resource control (radio resource control, RRC) signaling. Optionally, the configuration information of the SRS includes information such as a time-frequency resource of the SRS, a quantity of transmit antenna ports, and a measurement periodicity.

S302. The terminal device transmits the SRS to the access network device based on the configuration information of the SRS.

When the terminal device transmits the SRS, total power is equally divided, according to a protocol, for antenna ports used to transmit the SRS in this round, and the SRS is sent based on the time-frequency resource configured by the access network device. For example, the protocol may be the protocol 36.211 applied to long term evolution (long term evolution) in 3rd Generation Partnership Project (3rd generation partnership project, 3GPP) protocols, or the protocol 38.213 applied to a 5th generation mobile communications technology (the 5th generation mobile communication technology, 5G). Optionally, before the terminal device transmits the SRS to the access network device based on the configuration information of the SRS, the terminal device may choose whether to perform a transmit power reduction operation on the SRS according to an SAR requirement.

Figure 4:
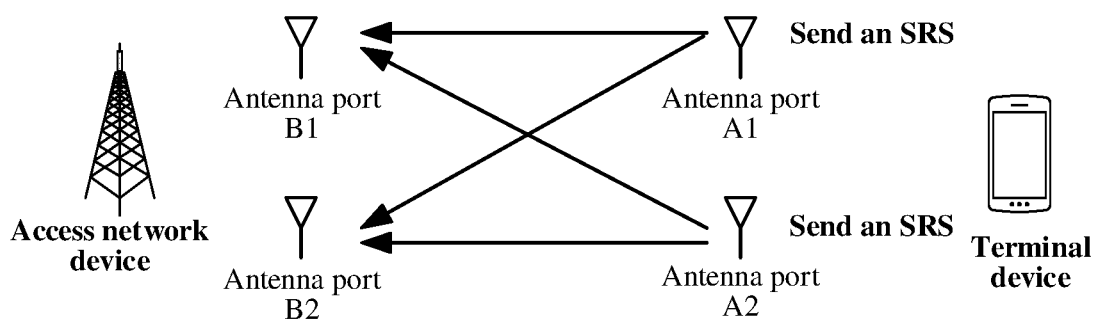
FIG. 4 is a schematic diagram of a process of transmitting an SRS according to an embodiment of this application.

In a possible implementation, a quantity of antennas for sending a data signal by the terminal device is equal to a quantity of antennas for receiving data by the terminal device. In this case, the terminal device uses all antenna ports to transmit the SRS. FIG. 4 is a schematic diagram of a process of transmitting an SRS according to an embodiment of this application. The terminal device is a device having two antennas for sending and two antennas for receiving (2T2R). To be specific, the terminal device includes a total of two antenna ports: an antenna port A1 and an antenna port A2. The antenna port A1 and the antenna port A2 of the terminal device are both used to send a data signal, and the antenna port A1 and the antenna port A2 are both used to receive a data signal. The access network device is also a device having two antennas for sending and two antennas for receiving (2T2R), and includes a total of two antenna ports: an antenna port B1 and an antenna port B2. The antenna port B1 and the antenna port B2 of the access network device are both used to send a data signal, and the antenna port B1 and the antenna port B2 are both used to receive a data signal.

Figure 5:
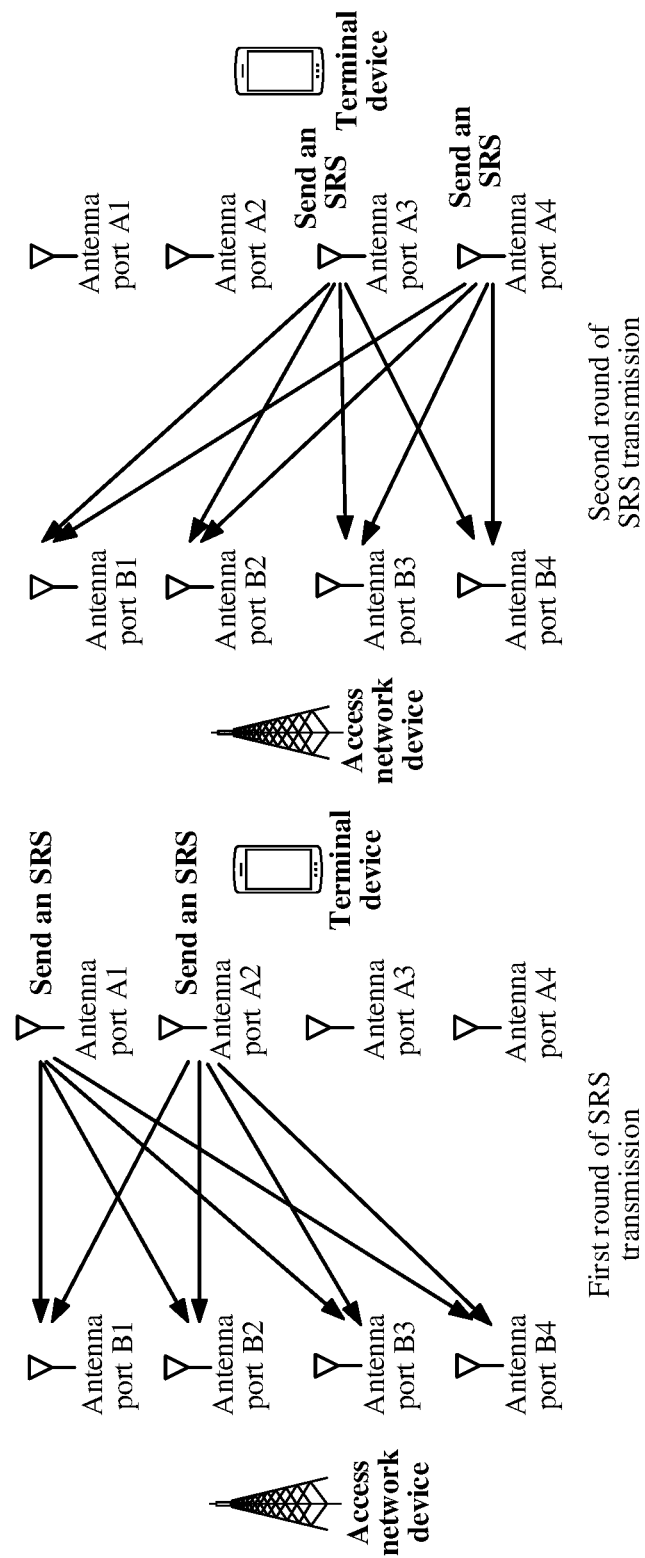
FIG. 5 is a schematic diagram of a process of transmitting an SRS in turn according to an embodiment of this application.

In a possible implementation, a quantity of antennas for sending a data signal by the terminal device is less than to a quantity of antennas for receiving data by the terminal device. In this case, the terminal device uses an SRS in-turn transmitting technology to measure and cover all receive antenna ports. FIG. 5 is a schematic diagram of a process of transmitting an SRS in turn according to an embodiment of this application. The terminal device is a device having two antennas for sending and four antennas for receiving (2T4R). To be specific, the terminal device includes a total of four antenna ports: an antenna port A1, an antenna port A2, an antenna port A3, and an antenna port A4. The antenna port A1 and the antenna port A2 of the terminal device are used to send a data signal, and the four antenna ports of the terminal device are all used to receive a data signal. The access network device is a device having four antennas for sending and four antennas for receiving (4T4R). To be specific, the access network device includes a total of four antenna ports: an antenna port B1, an antenna port B2, an antenna port B3, and an antenna port B4. The four antenna ports of the access network device are all used to send a data signal and receive a data signal. In this case, the terminal device may use the antenna port A1 and the antenna port A2 to perform a first round of SRS transmission; and then use the antenna port A3 and the antenna port A4 to perform a second round of SRS transmission.

In another possible implementation, the terminal device may further send, to the access network device by using higher layer signaling (such as RRC signaling), an identifier of an antenna port for transmitting the SRS in this round, and notify the access network device of the identifier of the antenna port used by the terminal device to send a data signal. FIG. 4 is used as an example. The terminal device may notify the access network device by using higher layer signaling that identifiers of antenna ports used by the terminal device to send a data signal are A1 and A2. If the terminal device uses the antenna port 1 and the antenna port 2 to perform the first round of SRS transmission, the terminal device transmits, to the access network device through the higher layer signaling, the identifiers A1 and A2 of the antenna ports for transmitting the SRS in this round. If the terminal device uses the antenna port 3 and the antenna port 4 to perform the second round of SRS transmission, the terminal device sends, to the access network device by using the higher layer signaling, the identifiers A3 and A4 of the antenna ports for transmitting the SRS in this round.

S303. The terminal device sends, to the access network device, a power adjustment factor used by first antenna ports.

The first antenna ports are antenna ports used by the terminal device to send a data signal. Because positions of the first antenna ports configured on the terminal device are different, additionally as a posture of a user using the terminal device changes, distances between the first antenna ports and a human body are different. Therefore, SARs detected for the first antenna ports are different, and further, the first antenna ports use different power adjustment factors.

There are two methods for sending, by the terminal device, the power adjustment factors used by the first antenna ports, and the two methods are described below.

In a method 1, the terminal device sends, to the access network device, a power adjustment factor used by each antenna port in the first antenna ports.

In a method 2, the terminal device sends, to the access network device, a power adjustment factor used by a target antenna port in the first antenna ports, and a ratio of a power adjustment factor used by a third antenna port to the power adjustment factor used by the target antenna port. The third antenna port is an antenna port other than the target antenna port in the first antenna ports.

Optionally, the method for sending, by the terminal device to the access network device, the power adjustment factor used by the first antenna ports may be: sending, by the terminal device to the access network device based on a preset periodicity, the power adjustment factor used by the first antenna ports. The preset periodicity may be set by a user, for example, may be 100 microseconds, 200 microseconds, or the like.

S304. After the access network device receives the SRS from the terminal device, the access network device determines a first uplink channel based on the SRS.

Specifically, the access network device computes a fading coefficient of a data transmission path between a transmit antenna port of the terminal device and a receive antenna port of the access network device based on the received SRS and the configuration information of the SRS, and determines the first uplink channel based on the fading coefficient of the data transmission path.

S305. The access network device receives, from the terminal device, the power adjustment factor used by the first antenna ports, and the access network device determines a target channel based on the first uplink channel and the power adjustment factor used by the first antenna ports.

The target channel is a target uplink channel or a target downlink channel. Specifically, for a process in which the access network device determines the target uplink channel based on the first uplink channel and the power adjustment factor used by the first antenna ports, refer to the following detailed descriptions of a procedure shown in FIG. 5. Details are not described herein. For a process in which the access network device determines the target downlink channel based on the first uplink channel and the power adjustment factor used by the first antenna ports, refer to the following detailed descriptions of a procedure shown in FIG. 6. Details are not described herein.

In the method shown in FIG. 3, the access network device configures one SRS for the terminal device, and in a target channel measurement process, first, the access network device receives, from the terminal device, the sounding reference signal SRS, and the power adjustment factor used by the antenna ports that are used by the terminal device to send a data signal. Then, the access network device may determine the first uplink channel based on the SRS; and determine the target channel based on the first uplink channel and the power adjustment factor, where the target channel is the target uplink channel or the target downlink channel. It can be learned that, in this method, the access network device needs to configure only one SRS for the terminal device, and in a process of computing the target channel, the access network device considers impact, on channel measurement, of an SAR reduction operation on an antenna port used by the terminal device to send a data signal. Therefore, in this solution, accuracy of channel measurement can be improved without increasing air interface resources.

Figure 6:
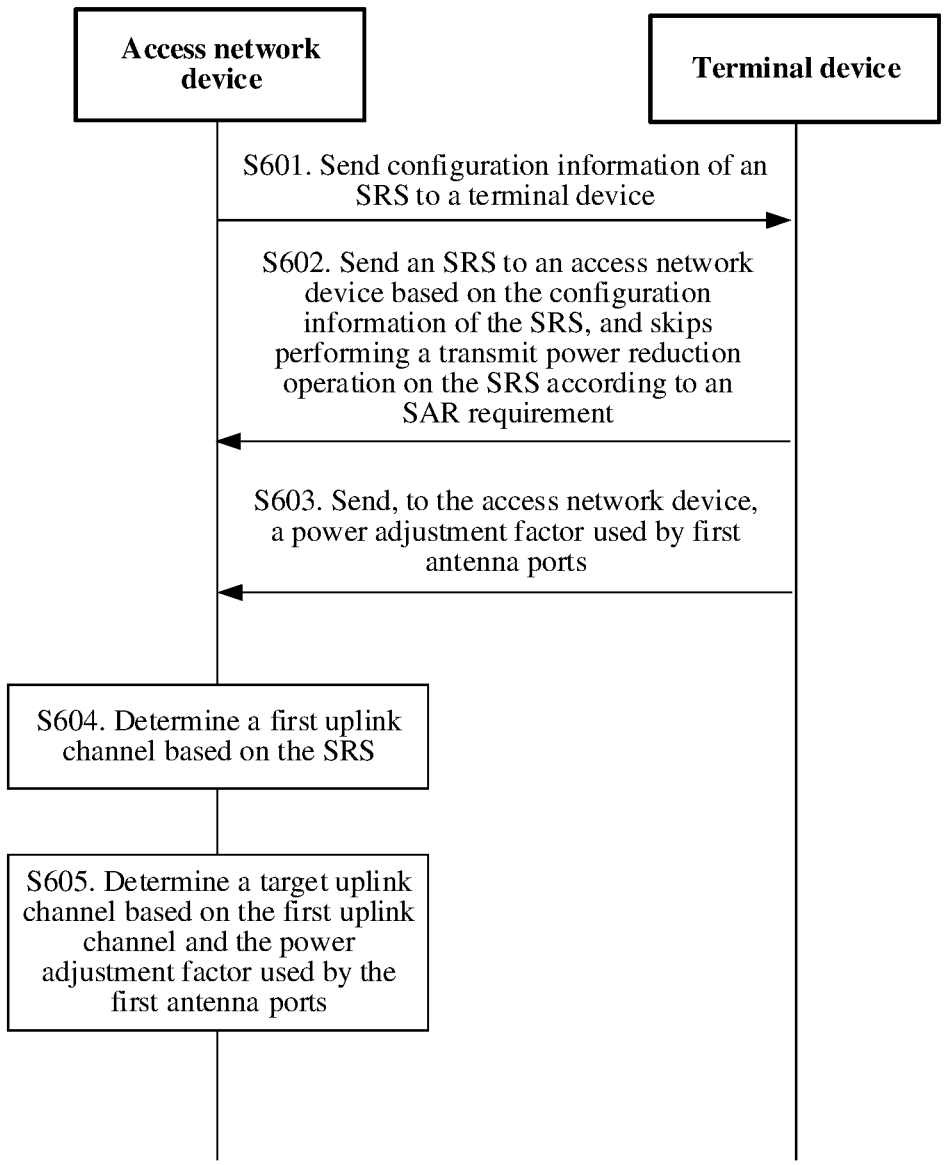
FIG. 6 is a flowchart of a channel measurement method according to an embodiment of this application.

FIG. 6 is a flowchart of a channel measurement method according to an embodiment of this application. The method may be implemented based on the architecture shown in FIG. 1. An access network device described below may be the access network device in the system architecture shown in FIG. 1. A terminal device described below may be the terminal device in the system architecture shown in FIG. 1. The method includes but is not limited to the following steps.

S601. The access network device sends configuration information of an SRS to the terminal device.

For an implementation of this step, refer to the descriptions of the foregoing step S301. Details are not described herein again.

S602. The terminal device transmits an SRS to the access network device based on the configuration information of the SRS, and the terminal device skips performing a transmit power reduction operation on the SRS according to an SAR requirement.

S603. The access network device receives the sounding reference signal SRS from the terminal device.

The SRS includes a first SRS sent by the terminal device by using first antenna ports, and the first antenna ports are antenna ports used by the terminal device to send a data signal.

There may be two cases for the SRS received by the access network device from the terminal device, and the two cases are described below.

Case 1: Refer to the foregoing content of FIG. 4. A quantity of antennas for sending a data signal by the terminal device is equal to a quantity of antennas for receiving data by the terminal device. In this case, all the SRS received by the access network device from the terminal device is the first SRS.

Case 2: Refer to the foregoing content of FIG. 5. A quantity of antennas for sending a data signal by the terminal device is less than a quantity of antennas for receiving data by the terminal device. In this case, the SRS further includes a second SRS sent by the terminal device by using a second antenna port, and the second antenna port is an antenna port not used by the terminal device to send a data signal. In this case, the access network device may determine, based on an identifier that is sent by the terminal device and that is of an antenna port for transmitting the SRS in this round, whether the SRS received in this round is the first SRS. FIG. 5 is used as an example. If identifiers that are received by the terminal device and that are of antenna ports for transmitting an SRS in this round are A1 and A2, the access network device may determine that the SRS received in this round is the first SRS.

S604. The terminal device sends, to the access network device, a power adjustment factor used by the first antenna ports.

For an implementation of this step, refer to the descriptions of the foregoing step S304. Details are not described herein again.

S605. The access network device determines a first uplink channel based on the SRS.

Specifically, a method for determining, by the access network device, the first uplink channel based on the SRS is: determining, by the access network device, the first uplink channel based on the first SRS.

S606. The access network device determines a target uplink channel based on the first uplink channel and the power adjustment factor used by the first antenna ports.

There are two manners in which the access network device determines the target uplink channel based on the first uplink channel and the power adjustment factor used by the first antenna ports, and the two manners are described below.

In a manner 1, if the terminal device sends, to the access network device, a power adjustment factor used by each antenna port in the first antenna ports, a manner in which the access network device determines the target uplink channel based on the first uplink channel and the power adjustment factor used by the first antenna ports is: multiplying the power adjustment factor used by each antenna port by an uplink channel corresponding to each transmit antenna in the first uplink channel, to determine the target uplink channel.

In a possible implementation, it is assumed that the quantity of antennas for sending a data signal by the terminal device is equal to the quantity of antennas for receiving data by the terminal device, using FIG. 4 as an example, a power adjustment factor of the antenna port A1 of the terminal device is γ, and a power adjustment factor of the antenna port A2 is φ.

The first uplink channel $H_{UL-1}^{SRS}$ determined by the terminal device is shown in Formula 1-3:

$$H_{UL-1}^{SRS} = \begin{bmatrix} h_{11} & h_{12} \\ h_{21} & h_{22} \end{bmatrix} \quad 1\text{-}3$$

In this case, the target uplink channel $H_{UL-1}$ is shown in Formula 1-4:

$$H_{UL-1} = H_{UL-1}^{SRS} \begin{bmatrix} \gamma & 0 \\ 0 & \varphi \end{bmatrix} = \begin{bmatrix} h_{11} & h_{12} \\ h_{21} & h_{22} \end{bmatrix} \begin{bmatrix} \gamma & 0 \\ 0 & \varphi \end{bmatrix} = \begin{bmatrix} \gamma h_{11} & \varphi h_{12} \\ \gamma h_{21} & \varphi h_{22} \end{bmatrix} \quad 1\text{-}4$$

In another possible implementation, it is assumed that the quantity of antennas for sending a data signal by the terminal device is less than to the quantity of antennas for receiving data by the terminal device, using FIG. 5 as an example, a power adjustment factor used by the antenna port A1 of the terminal device is γ, and a power adjustment factor used by the antenna port A2 is φ.

The first uplink channel $H_{UL-2}^{SRS}$ determined by the terminal device may be shown in Formula 1-5:

$$H_{UL-2}^{SRS} = \begin{bmatrix} h_{11} & h_{12} \\ h_{21} & h_{22} \\ h_{31} & h_{32} \\ h_{41} & h_{42} \end{bmatrix} \quad 1\text{-}5$$

In this case, the target uplink channel $H_{UL-2}$ is shown in Formula 1-6:

$$H_{UL-2} = H_{UL-2}^{SRS} \begin{bmatrix} \gamma & 0 \\ 0 & \varphi \end{bmatrix} = \begin{bmatrix} h_{11} & h_{12} \\ h_{21} & h_{22} \\ h_{31} & h_{32} \\ h_{41} & h_{42} \end{bmatrix} \begin{bmatrix} \gamma & 0 \\ 0 & \varphi \end{bmatrix} = \begin{bmatrix} \gamma h_{11} & \varphi h_{12} \\ \gamma h_{21} & \varphi h_{22} \\ \gamma h_{31} & \varphi h_{32} \\ \gamma h_{41} & \varphi h_{42} \end{bmatrix} \quad 1\text{-}6$$

In a manner 2, it is assumed that the access network device receives, from the terminal device, a power adjustment factor used by a target antenna port in the first antenna ports, and a ratio of a power adjustment factor used by a third antenna port to the power adjustment factor used by the target antenna port, where the third antenna port is an antenna port other than the target antenna port in the first antenna ports. In this case, a manner in which the access network device determines the target channel based on the first uplink channel and the power adjustment factor used by the first antenna ports is: computing, by the access network device, the target channel based on the first uplink channel, the power adjustment factor used by the target antenna port, and the ratio.

In a possible implementation, it is assumed that the quantity of antennas for sending a data signal by the terminal device is equal to the quantity of antennas for receiving data by the terminal device, using FIG. 4 as an example, a power adjustment factor used by the target antenna port A1 of the terminal device is γ, and a ratio φ/γ of a power adjustment factor used by the third antenna port A2 to the power adjustment factor used by the target antenna port is β. The first uplink channel $H_{UL-1}^{SRS}$ determined by the terminal device may be shown in the foregoing Formula 1-3.

In this case, the target uplink channel $H_{UL-1}$ is shown in Formula 1-7:

$$H_{UL-1} = H_{UL-1}^{SRS} * \gamma * \begin{bmatrix} 1 & 0 \\ 0 & \beta \end{bmatrix} = \begin{bmatrix} h_{11} & h_{12} \\ h_{21} & h_{22} \end{bmatrix} * \gamma * \begin{bmatrix} 1 & 0 \\ 0 & \beta \end{bmatrix} = \begin{bmatrix} \gamma h_{11} & \varphi h_{12} \\ \gamma h_{21} & \varphi h_{22} \end{bmatrix} \quad 1\text{-}7$$

In another possible implementation, it is assumed that the quantity of antennas for sending a data signal by the terminal device is less than the quantity of antennas for receiving data by the terminal device, using FIG. 5 as an example, a power adjustment factor used by the target antenna port A1 of the terminal device is γ, and a ratio φ/γ of a power adjustment factor used by the third antenna port A2 to the power adjustment factor used by the target antenna port is β. The first uplink channel $H_{UL-2}^{SRS}$ determined by the terminal device may be shown in the foregoing Formula 1-5. In this case, the target uplink channel $H_{UL-2}$ is shown in Formula 1-8:

$$H_{UL-2} = H_{UL-2}^{SRS} * \gamma * \begin{bmatrix} 1 & 0 \\ 0 & \beta \end{bmatrix} = \begin{bmatrix} h_{11} & h_{12} \\ h_{21} & h_{22} \\ h_{31} & h_{32} \\ h_{41} & h_{42} \end{bmatrix} * \gamma * \begin{bmatrix} 1 & 0 \\ 0 & \beta \end{bmatrix} = \begin{bmatrix} \gamma h_{11} & \varphi h_{12} \\ \gamma h_{21} & \varphi h_{22} \\ \gamma h_{31} & \varphi h_{32} \\ \gamma h_{41} & \varphi h_{42} \end{bmatrix} \quad 1\text{-}8$$

Optionally, the access network device may further determine a target downlink channel based on the first uplink channel. There are two manners in which the access network device determines the target downlink channel based on the first uplink channel, and the two manners are described below.

In a manner 1, if the quantity of antennas for sending a data signal by the terminal device is equal to the quantity of antennas for receiving data by the terminal device, the access network device may determine the target downlink channel based on the first uplink channel. The access network device may determine the target downlink channel based on the first uplink channel and reciprocity.

FIG. 4 is used as an example. The first uplink channel $H_{UL-1}^{SRS}$ determined by the terminal device is shown in the foregoing Formula 1-3, and the target downlink channel $H_{DL-1}$ is shown in Formula 1-9:

$$H_{DL-1} = (H_{UL-1}^{SRS})^T = \begin{bmatrix} h_{11} & h_{21} \\ h_{12} & h_{22} \end{bmatrix} \quad 1\text{-}9$$

In a manner 2, the SRS further includes a second SRS sent by the terminal device by using a second antenna port, and the second antenna port is an antenna port not used by the terminal device to send a data signal. A manner in which the access network device determines the target downlink channel based on the first uplink channel is: determining, by the access network device, a second uplink channel based on the second SRS, and computing, by the access network device, the target downlink channel based on the first uplink channel and the second uplink channel.

FIG. 5 is used as an example. The first uplink channel $H_{UL-2}^{SRS}$ determined by the terminal device is shown in the foregoing Formula 1-5, and the second uplink channel $H_{UL-3}^{SRS}$ determined by the terminal device is shown in Formula 1-10:

$$H_{UL-3}^{SRS} = \begin{bmatrix} h_{13} & h_{14} \\ h_{23} & h_{24} \\ h_{33} & h_{34} \\ h_{43} & h_{44} \end{bmatrix} \quad 1\text{-}10$$

In this case, the target downlink channel $H_{DL-2}$ is shown in Formula $$H_{DL-2} = (H_{UL-2}^{SRS} H_{UL-3}^{SRS})^T = \begin{bmatrix} h_{11} & h_{12} & h_{13} & h_{14} \\ h_{21} & h_{22} & h_{23} & h_{24} \\ h_{31} & h_{32} & h_{33} & h_{34} \\ h_{41} & h_{42} & h_{43} & h_{44} \end{bmatrix}^T = \begin{bmatrix} h_{11} & h_{21} & h_{31} & h_{41} \\ h_{12} & h_{22} & h_{32} & h_{42} \\ h_{13} & h_{23} & h_{33} & h_{43} \\ h_{14} & h_{24} & h_{34} & h_{44} \end{bmatrix} \quad 1\text{-}11$$

In the method shown in FIG. 6, the access network device configures one SRS for the terminal device, and in a target channel measurement process, first, the access network device receives, from the terminal device, the sounding reference signal SRS, and the power adjustment factor used by the antenna ports that are used by the terminal device to send a data signal. Then, the access network device may determine the first uplink channel based on the SRS; and determine the target channel based on the first uplink channel and the power adjustment factor, where the target channel is the target uplink channel or the target downlink channel. It can be learned that, in this method, the access network device needs to configure only one SRS for the terminal device, and in a process of computing the target channel, the access network device considers impact, on channel measurement, of an SAR reduction operation on an antenna port used by the terminal device to send a data signal. Therefore, in this solution, accuracy of channel measurement can be improved without increasing air interface resources.

Figure 7:
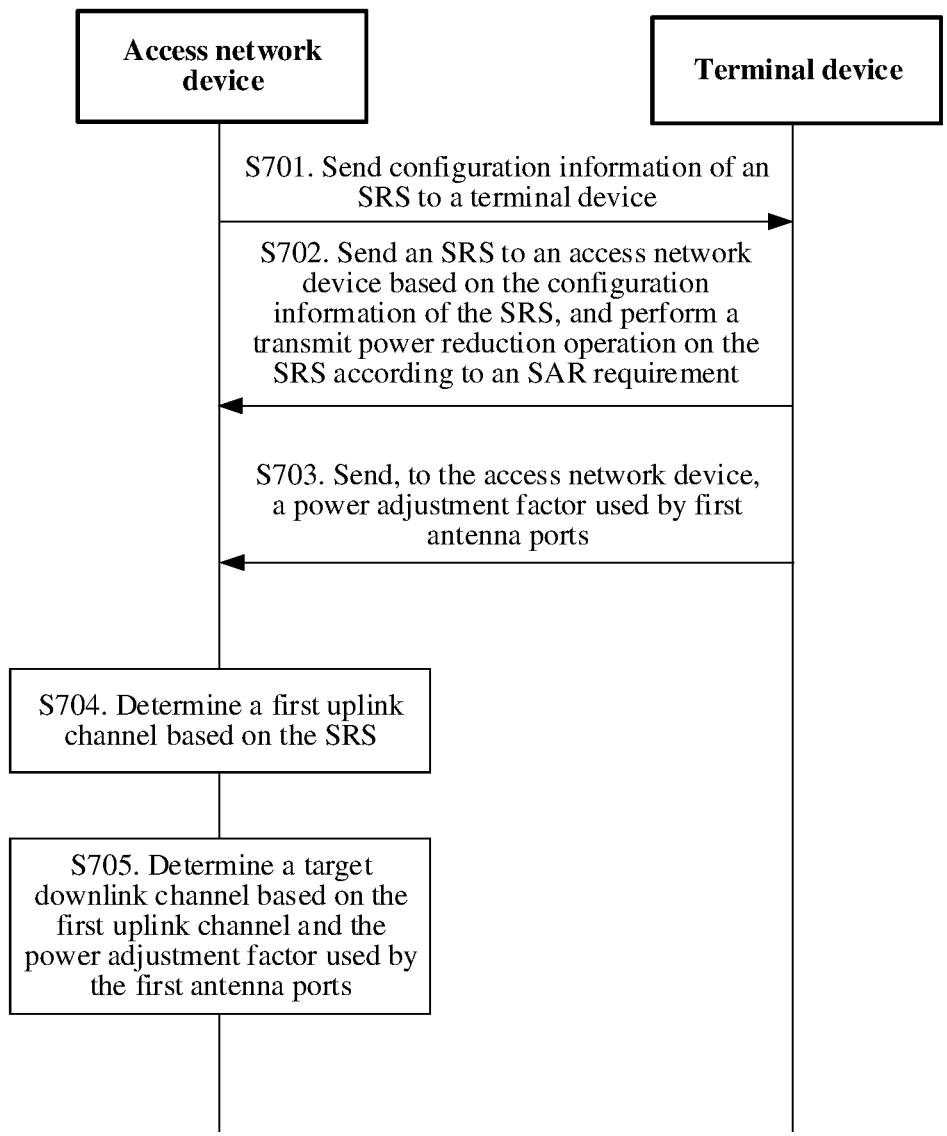
FIG. 7 is a flowchart of a channel measurement method according to an embodiment of this application.

FIG. 7 is a flowchart of a channel measurement method according to an embodiment of this application. The method may be implemented based on the architecture shown in FIG. 1. An access network device described below may be the access network device in the system architecture shown in FIG. 1. A terminal device described below may be the terminal device in the system architecture shown in FIG. 1. The method includes but is not limited to the following steps.

S701. The access network device sends configuration information of an SRS to a terminal device.

For an implementation of this step, refer to the descriptions of the foregoing step S301. Details are not described herein again.

S702. The terminal device transmits the SRS to the access network device based on the configuration information of the SRS, and the terminal device performs a transmit power reduction operation on the SRS according to an SAR requirement.

S703. The access network device receives the sounding reference signal SRS from the terminal device.

There are two cases for the SRS received by the access network device from the terminal device, and the two cases are described below.

Case 1: Refer to the foregoing content of FIG. 4. A quantity of antennas for sending a data signal by the terminal device is equal to a quantity of antennas for receiving data by the terminal device. In this case, the SRS received by the access network device from the terminal device includes only a first SRS sent by the terminal device by using first antenna ports.

Case 2: Refer to the foregoing content of FIG. 5. A quantity of antennas for sending a data signal by the terminal device is less than a quantity of antennas for receiving data by the terminal device. In this case, the SRS includes a first SRS sent by the terminal device by using first antenna ports, and a second SRS sent by the terminal device by using a second antenna port. The second antenna port is an antenna port not used by the terminal device to send a data signal. In this case, the access network device may determine, based on an identifier that is sent by the terminal device and that is of an antenna port for transmitting the SRS in this round, whether the SRS received in this round is the first SRS. FIG. 5 is used as an example. If identifiers that are received by the terminal device and that are of antenna ports for transmitting an SRS in this round are A1 and A2, the access network device may determine that the SRS received in this round is the first SRS.

S704. The terminal device sends, to the access network device, a power adjustment factor used by the first antenna ports.

For an implementation of this step, refer to the descriptions of the foregoing step S304. Details are not described herein again.

S705. The access network device determines a first uplink channel based on the SRS.

There may be two cases for determining, by the access network device, the first uplink channel based on the SRS, and the two cases are described below.

Case 1: The quantity of antennas for sending a data signal by the terminal is equal to the quantity of antennas for receiving a data signal, the SRS received by the access network device from the terminal device includes only the first SRS sent by the terminal device by using the first antenna ports. In this case, the access network device determines the first uplink channel based on the first SRS.

Case 2: The quantity of antennas for sending a data signal by the terminal is less than the quantity of antennas for receiving a data signal, and the SRS received by the access network device from the terminal device includes the first SRS sent by the terminal device by using the first antenna ports and the second SRS sent by the terminal device by using the second antenna port. In this case, the first uplink channel includes a second uplink channel and a third uplink channel, and the determining, by the access network device, a first uplink channel based on the SRS includes: determining, by the access network device, the second uplink channel based on the first SRS; and determining, by the access network device, the third uplink channel based on the second SRS.

S706. The access network device determines a target downlink channel based on the first uplink channel and the power adjustment factor used by the first antenna ports.

There are two manners in which the access network device determines the target downlink channel based on the first uplink channel and the power adjustment factor used by the first antenna ports.

In a manner 1, for the case 1 for determining the first uplink channel mentioned in step S705, the quantity of antennas for sending a data signal by the terminal device is equal to the quantity of antennas for receiving data by the terminal device. In this case, a manner in which the access network device determines the target downlink channel based on the first uplink channel and the power adjustment factor used by the first antenna ports is: determining, by the access network device, a fifth uplink channel based on the first uplink channel and the power adjustment factor used by the first antenna ports; and determining, by the access network device, the target downlink channel based on the fifth uplink channel.

There are two manners in which the access network device determines the fifth uplink channel based on the first uplink channel and the power adjustment factor used by the first antenna ports, and the two manners are described below.

FIG. 4 is used as an example. The first uplink channel $H_{UL-4}^{SRS}$ determined by the terminal device is shown in Formula 1-12:

$$H_{UL-4}^{SRS} = \begin{bmatrix} h_{11} & h_{12} \\ h_{21} & h_{22} \end{bmatrix} \quad 1\text{-}12$$

In a manner 1, if the terminal device sends, to the access network device, a power adjustment factor used by each antenna port in the first antenna ports, the determining, by the access network device, a fifth uplink channel based on the first uplink channel and the power adjustment factor used by the first antenna ports is: multiplying a reciprocal of the power adjustment factor used by each antenna port by an uplink channel corresponding to each transmit antenna in the first uplink channel, to determine the fifth uplink channel.

It is assumed that a power adjustment factor of the antenna port A1 of the terminal device is $\gamma$, and a power adjustment factor of the antenna port A2 is $\varphi$.

In this case, the fifth uplink channel $H_{UL-4}$ is shown in Formula 1-13:

$$H_{UL-4} = H_{UL-4}^{SRS} \begin{bmatrix} \frac{1}{\gamma} & 0 \\ 0 & \frac{1}{\varphi} \end{bmatrix} = \begin{bmatrix} h_{11} & h_{12} \\ h_{21} & h_{22} \end{bmatrix} \begin{bmatrix} \frac{1}{\gamma} & 0 \\ 0 & \frac{1}{\varphi} \end{bmatrix} = \begin{bmatrix} \frac{h_{11}}{\gamma} & \frac{h_{12}}{\varphi} \\ \frac{h_{21}}{\gamma} & \frac{h_{22}}{\varphi} \end{bmatrix} \quad 1\text{-}13$$

In a manner 2, it is assumed that the access network device receives, from the terminal device, a power adjustment factor used by a target antenna port in the first antenna ports, and a ratio of a power adjustment factor used by a third antenna port to the power adjustment factor used by the target antenna port, where the third antenna port is an antenna port other than the target antenna port in the first antenna ports. In this case, the determining, by the access network device, a fifth uplink channel based on the first uplink channel and the power adjustment factor used by the first antenna ports is: determining, by the access network device, the fifth uplink channel based on the first uplink channel, the power adjustment factor used by the target antenna port, and the ratio.

It is assumed that a power adjustment factor used by the target antenna port A1 of the terminal device is $\gamma$, and a ratio $\varphi/\gamma$ of a power adjustment factor used by the third antenna port A2 to the power adjustment factor used by the target antenna port is 3.

In this case, the target uplink channel $H_{UL-4}$ is shown in Formula 1-14:

$$H_{UL-4} = H_{UL-4}^{SRS} * \frac{1}{\gamma} * \begin{bmatrix} 1 & 0 \\ 0 & \frac{1}{\beta} \end{bmatrix} = \begin{bmatrix} h_{11} & h_{12} \\ h_{21} & h_{22} \end{bmatrix} * \frac{1}{\gamma} * \begin{bmatrix} 1 & 0 \\ 0 & \frac{1}{\beta} \end{bmatrix} = \begin{bmatrix} \frac{h_{11}}{\gamma} & \frac{h_{12}}{\varphi} \\ \frac{h_{21}}{\gamma} & \frac{h_{22}}{\varphi} \end{bmatrix} \quad 1\text{-}14$$

Then, the access network device determines the target downlink channel based on the fifth uplink channel. Specifically, the access network device determines the target downlink channel based on the fifth uplink channel and reciprocity.

In this case, the target downlink channel $H_{DL-4}$ is shown in Formula 1-15:

$$H_{DL-4} = (H_{UL-4})^T = \begin{bmatrix} \frac{h_{11}}{\gamma} & \frac{h_{12}}{\varphi} \\ \frac{h_{21}}{\gamma} & \frac{h_{22}}{\varphi} \end{bmatrix}^T = \begin{bmatrix} \frac{h_{11}}{\gamma} & \frac{h_{21}}{\gamma} \\ \frac{h_{12}}{\varphi} & \frac{h_{22}}{\varphi} \end{bmatrix} \quad 1\text{-}15$$

In this case, the method further includes: determining, by the access network device, the target uplink channel as the first uplink channel $H_{UL-4}^{SRS}$.

In a manner 2, for the case 2 for determining the first uplink channel mentioned in step S705, the quantity of antennas for sending a data signal by the terminal device is less than to the quantity of antennas for receiving data by the terminal device. In this case, a manner in which the access network device determines the target downlink channel based on the first uplink channel and the power adjustment factor used by the first antenna ports is: determining, by the access network device, a fourth uplink channel based on the second uplink channel and the power adjustment factor used by the first antenna ports; and determining, by the access network device, the target downlink channel based on the third uplink channel and the fourth uplink channel.

There are two manners in which the access network device determines the fourth uplink channel based on the second uplink channel and the power adjustment factor used by the first antenna ports, and the two manners are described below.

FIG. 5 is used as an example. The second uplink channel $H_{UL-5}^{SRS}$ determined by the terminal device is shown in Formula 1-16:

$$H_{UL-5}^{SRS} = \begin{bmatrix} h_{11} & h_{12} \\ h_{21} & h_{22} \\ h_{31} & h_{32} \\ h_{41} & h_{42} \end{bmatrix} \quad 1\text{-}16$$

In a manner 1, if the terminal device sends, to the access network device, a power adjustment factor used by each antenna port in the first antenna ports, the determining, by the access network device, a fourth uplink channel based on the second uplink channel and the power adjustment factor used by the first antenna ports is: multiplying a reciprocal of the power adjustment factor used by each antenna port by an uplink channel corresponding to each transmit antenna in the second uplink channel, to determine the fifth uplink channel.

It is assumed that a power adjustment factor of the antenna port A1 of the terminal device is $\gamma$, and a power adjustment factor of the antenna port A2 is $\varphi$.

In this case, the fourth uplink channel $H_{UL-5}$ is shown in Formula 1-17:

$$H_{UL-5} = H_{UL-5}^{SRS} \begin{bmatrix} \frac{1}{\gamma} & 0 \\ 0 & \frac{1}{\varphi} \end{bmatrix} = \begin{bmatrix} h_{11} & h_{12} \\ h_{21} & h_{22} \\ h_{31} & h_{32} \\ h_{41} & h_{42} \end{bmatrix} \begin{bmatrix} \frac{1}{\gamma} & 0 \\ 0 & \frac{1}{\varphi} \end{bmatrix} = \begin{bmatrix} \frac{h_{11}}{\gamma} & \frac{h_{12}}{\varphi} \\ \frac{h_{21}}{\gamma} & \frac{h_{22}}{\varphi} \\ \frac{h_{31}}{\gamma} & \frac{h_{32}}{\varphi} \\ \frac{h_{41}}{\gamma} & \frac{h_{42}}{\varphi} \end{bmatrix} \quad 1\text{-}17$$

In a manner 2, it is assumed that the access network device receives, from the terminal device, a power adjustment factor used by a target antenna port in the first antenna ports, and a ratio of a power adjustment factor used by a third antenna port to the power adjustment factor used by the target antenna port, where the third antenna port is an antenna port other than the target antenna port in the first antenna ports. In this case, a manner in which the access network device determines a fourth uplink channel based on the second uplink channel and the power adjustment factor used by the first antenna ports is: determining, by the access network device, the fourth uplink channel based on the second uplink channel, the power adjustment factor used by the target antenna port, and the ratio.

It is assumed that a power adjustment factor used by the target antenna port A1 of the terminal device is $\gamma$, and a ratio $\varphi/\gamma$ of a power adjustment factor used by the third antenna port A2 to the power adjustment factor used by the target antenna port is 3.

In this case, the fourth uplink channel $H_{UL-5}$ is shown in Formula 1-18:

$$H_{UL-5} = H_{UL-5}^{SRS} * \frac{1}{\gamma} * \begin{bmatrix} 1 & 0 \\ 0 & \frac{1}{\beta} \end{bmatrix} = \begin{bmatrix} h_{11} & h_{12} \\ h_{21} & h_{22} \\ h_{31} & h_{32} \\ h_{41} & h_{42} \end{bmatrix} * \frac{1}{\gamma} * \begin{bmatrix} 1 & 0 \\ 0 & \frac{1}{\beta} \end{bmatrix} = \begin{bmatrix} \frac{h_{11}}{\gamma} & \frac{h_{12}}{\varphi} \\ \frac{h_{21}}{\gamma} & \frac{h_{22}}{\varphi} \\ \frac{h_{31}}{\gamma} & \frac{h_{32}}{\varphi} \\ \frac{h_{41}}{\gamma} & \frac{h_{42}}{\varphi} \end{bmatrix} \quad 1\text{-}18$$

Then, the access network device determines the target downlink channel based on the third uplink channel and the fourth uplink channel. Specifically, the access network device determines the target downlink channel based on reciprocity and a channel formed by the third uplink channel and the fourth uplink channel.

FIG. 5 is used as an example. The fourth uplink channel $H_{UL-5}$ determined by the terminal device is shown in the foregoing Formula 1-5, and the third uplink channel $H_{UL-6}^{SRS}$ determined by the terminal device is shown in Formula 1-19:

$$H_{UL-6}^{SRS} = \begin{bmatrix} h_{13} & h_{14} \\ h_{23} & h_{24} \\ h_{33} & h_{34} \\ h_{43} & h_{44} \end{bmatrix} \quad 1\text{-}19$$

In this case, the target downlink channel $H_{DL-6}$ is shown in Formula 1-20:

$$H_{DL-6} = (H_{UL-5} \; H_{UL-6}^{SRS})^T = \quad 1\text{-}20$$

$$\begin{bmatrix} \frac{h_{11}}{\gamma} & \frac{h_{12}}{\varphi} & h_{13} & h_{14} \\ \frac{h_{21}}{\gamma} & \frac{h_{22}}{\varphi} & h_{23} & h_{24} \\ \frac{h_{31}}{\gamma} & \frac{h_{32}}{\varphi} & h_{33} & h_{34} \\ \frac{h_{41}}{\gamma} & \frac{h_{42}}{\varphi} & h_{43} & h_{44} \end{bmatrix}^T = \begin{bmatrix} \frac{h_{11}}{\gamma} & \frac{h_{21}}{\gamma} & \frac{h_{31}}{\gamma} & \frac{h_{41}}{\gamma} \\ \frac{h_{12}}{\varphi} & \frac{h_{22}}{\varphi} & \frac{h_{32}}{\varphi} & \frac{h_{42}}{\varphi} \\ h_{13} & h_{23} & h_{33} & h_{43} \\ h_{14} & h_{24} & h_{34} & h_{44} \end{bmatrix}$$

In this case, the method further includes: determining, by the access network device, the target uplink channel as the second uplink channel $H_{UL-5}^{SRS}$.

In the method shown in FIG. 7, the access network device configures one SRS for the terminal device, and in a target channel measurement process, first, the access network device receives, from the terminal device, the sounding reference signal SRS, and the power adjustment factor used by the antenna ports that are used by the terminal device to send a data signal. Then, the access network device may determine the first uplink channel based on the SRS; and determine the target channel based on the first uplink channel and the power adjustment factor, where the target channel is the target uplink channel or the target downlink channel. It can be learned that, in this method, the access network device needs to configure only one SRS for the terminal device, and in a process of computing the target channel, the access network device considers impact, on channel measurement, of an SAR reduction operation on an antenna port used by the terminal device to send a data signal. Therefore, in this solution, accuracy of channel measurement can be improved without increasing air interface resources.

The method embodiments of this application are described above, and corresponding apparatus embodiments are described below.

Figure 8:
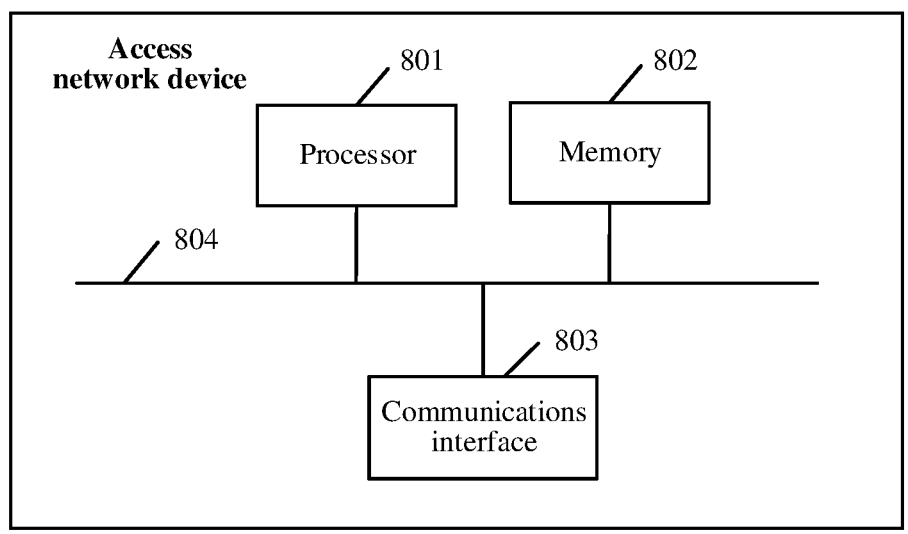
FIG. 8 is a schematic diagram of an access network device according to an embodiment of this application.

FIG. 8 shows an access network device according to an embodiment of this application. The first exciter includes a processor 801, a memory 802, and a communications interface 803. The processor 801, the memory 802, and the communications interface 803 are mutually connected by using a communications bus 804.

The memory 802 includes but is not limited to a random access memory (random access memory, RAM), a read-only memory (read-only memory, ROM), an erasable programmable read-only memory (erasable programmable read only memory, EPROM), or a portable read-only memory (compact disc read-only memory, CD-ROM). The memory 802 is configured to store a related instruction and data.

The processor 801 may be one or more central processing units (central processing units, CPUs). When the processor 801 is one CPU, the CPU may be a single-core CUP, or may be a multi-core CPU.

The processor 801 in the access network device is configured to read program code stored in the memory 802, to perform the following operations:

receiving a sounding reference signal SRS from a terminal device by using the communications interface;

receiving, by using the communications interface from the terminal device, a power adjustment factor used by first antenna ports, where the first antenna ports are antenna ports used by the terminal device to send a data signal;

determining a first uplink channel based on the SRS; and determining a target channel based on the first uplink channel and the power adjustment factor used by the first antenna ports, where the target channel is a target uplink channel or a target downlink channel.

In a possible implementation, a quantity of antennas for sending a data signal by the terminal is less than a quantity of antennas for receiving a data signal, the target channel is the target uplink channel, and the SRS includes a first SRS sent by the terminal device by using the first antenna ports. The processor is specifically configured to determine the first uplink channel based on the first SRS.

In a possible implementation, the SRS further includes a second SRS sent by the terminal device by using a second antenna port, and the second antenna port is an antenna port not used by the terminal device to send a data signal. The processor is further configured to: determine a second uplink channel based on the second SRS; and compute the target downlink channel based on the first uplink channel and the second uplink channel.

In a possible implementation, the processor is specifically configured to: receive, by using the communications interface from the terminal device, a power adjustment factor used by a target antenna port in the first antenna ports, and a ratio of a power adjustment factor used by a third antenna port to the power adjustment factor used by the target antenna port, where the third antenna port is an antenna port other than the target antenna port in the first antenna ports; and compute the target channel based on the first uplink channel, the power adjustment factor used by the target antenna port, and the ratio.

In a possible implementation, a quantity of antennas for sending a data signal by the terminal is less than a quantity of antennas for receiving a data signal, the target channel is the target downlink channel, the SRS includes a first SRS sent by the terminal device by using the first antenna ports and a second SRS sent by the terminal device by using a second antenna port, and the second antenna port is an antenna port not used by the terminal device to send a data signal. The first uplink channel includes a second uplink channel and a third uplink channel, and the determining unit is specifically configured to: determine the second uplink channel based on the first SRS; determine the third uplink channel based on the second SRS; determine a fourth uplink channel based on the second uplink channel and the power adjustment factor used by the first antenna ports; and determine the target downlink channel based on the third uplink channel and the fourth uplink channel.

In a possible implementation, the processor is further configured to determine the second uplink channel as the target uplink channel.

In a possible implementation, the processor is specifically configured to: receive, from the terminal device, a power adjustment factor used by a target antenna port in the first antenna ports, and a ratio of a power adjustment factor used by a third antenna port to the power adjustment factor used by the target antenna port, where the third antenna port is an antenna port other than the target antenna port in the first antenna ports; and determine the fourth uplink channel based on the second uplink channel, the power adjustment factor used by the target antenna port, and the ratio.

In a possible implementation, a quantity of antennas for sending a data signal by the terminal is equal to a quantity of antennas for receiving a data signal, the target channel is the target downlink channel, and the SRS includes a first SRS sent by the terminal device by using the first antenna ports. The determining, by the access network device, a first uplink channel based on the SRS includes: determining, by the access network device, the first uplink channel based on the first SRS. The determining, by the access network device, a target channel based on the first uplink channel and the power adjustment factor used by the first antenna ports includes: determining, by the access network device, a fifth uplink channel based on the first uplink channel and the power adjustment factor used by the first antenna ports; and determining, by the access network device, the target downlink channel based on the fifth uplink channel.

In a possible implementation, the receiving, by the access network device from the terminal device, a power adjustment factor used by first antenna ports includes: receiving, by the access network device from the terminal device, a power adjustment factor used by a target antenna port in the first antenna ports, and a ratio of a power adjustment factor used by a third antenna port to the power adjustment factor used by the target antenna port, where the third antenna port is an antenna port other than the target antenna port in the first antenna ports. The determining, by the access network device, a fifth uplink channel based on the first uplink channel and the power adjustment factor used by the first antenna ports includes: determining, by the access network device, the fifth uplink channel based on the first uplink channel, the power adjustment factor used by the target antenna port, and the ratio.

In addition, for an implementation of each operation in FIG. 5, reference may be further made to the corresponding description in any method embodiment shown in FIG. 3, FIG. 6, or FIG. 7.

In the access network device shown in FIG. 8, the access network device configures one SRS for the terminal device, and in a target channel measurement process, first, the access network device receives, from the terminal device, the sounding reference signal SRS, and the power adjustment factor used by the antenna ports that are used by the terminal device to send a data signal. Then, the access network device may determine the first uplink channel based on the SRS; and determine the target channel based on the first uplink channel and the power adjustment factor, where the target channel is the target uplink channel or the target downlink channel. It can be learned that the access network device needs to configure only one SRS for the terminal device, and in a process of computing the target channel, the access network device considers impact, on channel measurement, of an SAR reduction operation on an antenna port used by the terminal device to send a data signal. Therefore, the access network device can improve accuracy of channel measurement without increasing air interface resources.

Another embodiment of this application provides a computer program product. When the computer program product runs on a computer, the method in any embodiment shown in FIG. 3, FIG. 6 or FIG. 7 is implemented.

Another embodiment of this application provides a computer-readable storage medium. The computer-readable storage medium stores a computer program, and when the computer program is executed by a computer, the method in any embodiment shown in FIG. 3, FIG. 6 or FIG. 7 is implemented.

The foregoing descriptions are merely specific implementations of this application, but the protection scope of this application is not limited thereto. Any equivalent modification or replacement readily figured out by a person skilled in the art within the technical scope disclosed in this application shall fall within the protection scope of this application. Therefore, the protection scope of this application shall be subject to the protection scope of the claims.

What is claimed is:

1. A channel measurement method, comprising:
receiving, by an access network device, a sounding reference signal (SRS) from a terminal device;
receiving, by the access network device from the terminal device, a power adjustment factor used by first antenna ports, wherein the first antenna ports are antenna ports used by the terminal device to send a data signal, the receiving comprising:
receiving, by the access network device from the terminal device, at least a power adjustment factor used by a target antenna port in the first antenna ports, and a ratio of a power adjustment factor used by a third antenna port to the power adjustment factor used by the target antenna port, wherein the third antenna port is an antenna port other than the target antenna port in the first antenna ports;
determining, by the access network device, a first uplink channel based on the SRS; and
determining, by the access network device, a target channel based on the first uplink channel and the power adjustment factor used by the first antenna ports, wherein the target channel is a target uplink channel or a target downlink channel, the determining comprising:
computing, by the access network device, the target channel based on the first uplink channel, the power adjustment factor used by the target antenna port, and the ratio.

2. The method according to claim 1, wherein a quantity of antennas for sending a data signal by the terminal is less than a quantity of antennas for receiving a data signal, the target channel is the target uplink channel, and the SRS comprises a first SRS sent by the terminal device by using the first antenna ports; and
wherein determining, by the access network device, the first uplink channel based on the SRS comprises:
determining, by the access network device, the first uplink channel based on the first SRS.

3. The method according to claim 2, wherein the SRS further comprises a second SRS sent by the terminal device by using a second antenna port, and the second antenna port is an antenna port not used by the terminal device to send a data signal; and the method further comprises:
determining, by the access network device, a second uplink channel based on the second SRS; and
computing, by the access network device, the target downlink channel based on the first uplink channel and the second uplink channel.

4. The method according to claim 1, wherein a quantity of antennas for sending a data signal by the terminal is less than a quantity of antennas for receiving a data signal, the target channel is the target downlink channel, the SRS comprises a first SRS sent by the terminal device by using the first antenna ports and a second SRS sent by the terminal device by using a second antenna port, and the second antenna port is an antenna port not used by the terminal device to send a data signal;
wherein the first uplink channel comprises a second uplink channel and a third uplink channel, and determining, by the access network device, the first uplink channel based on the SRS comprises:
determining, by the access network device, the second uplink channel based on the first SRS; and
determining, by the access network device, the third uplink channel based on the second SRS; and
wherein determining, by the access network device, the target channel based on the first uplink channel and the power adjustment factor used by the first antenna ports comprises:
determining, by the access network device, a fourth uplink channel based on the second uplink channel and the power adjustment factor used by the first antenna ports; and
determining, by the access network device, the target downlink channel based on the third uplink channel and the fourth uplink channel.

5. The method according to claim 4, wherein the method further comprises:
determining, by the access network device, the second uplink channel as the target uplink channel.

6. The method according to claim 4,
wherein determining, by the access network device, the fourth uplink channel based on the second uplink channel and the power adjustment factor used by the first antenna ports comprises:
determining, by the access network device, the fourth uplink channel based on the second uplink channel, the power adjustment factor used by the target antenna port, and the ratio.

7. The method according to claim 1, wherein a quantity of antennas for sending a data signal by the terminal is equal to a quantity of antennas for receiving a data signal, the target channel is the target downlink channel, and the SRS comprises a first SRS sent by the terminal device by using the first antenna ports;
wherein determining, by the access network device, a first uplink channel based on the SRS comprises:
determining, by the access network device, the first uplink channel based on the first SRS; and
wherein determining, by the access network device, the target channel based on the first uplink channel and the power adjustment factor used by the first antenna ports comprises:
determining, by the access network device, a fifth uplink channel based on the first uplink channel and the power adjustment factor used by the first antenna ports; and
determining, by the access network device, the target downlink channel based on the fifth uplink channel.

8. The method according to claim 7,
wherein determining, by the access network device, the fifth uplink channel based on the first uplink channel and the power adjustment factor used by the first antenna ports comprises:
determining, by the access network device, the fifth uplink channel based on the first uplink channel, the power adjustment factor used by the target antenna port, and the ratio.

9. An access network device, wherein the access network device comprises at least one processor, a memory, and a communications interface;
the memory is configured to store program instructions;

wherein the at least one processor is configured to perform the following operations based on the program instructions:
receiving a sounding reference signal (SRS) from a terminal device by using the communications interface;
receiving, by using the communications interface from the terminal device, a power adjustment factor used by first antenna ports, wherein the first antenna ports are antenna ports used by the terminal device to send a data signal, wherein receiving the power adjustment factor used by the first antenna ports comprises:
receiving at least a power adjustment factor used by a target antenna port in the first antenna ports, and a ratio of a power adjustment factor used by a third antenna port to the power adjustment factor used by the target antenna port, wherein the third antenna port is an antenna port other than the target antenna port in the first antenna ports;
determining a first uplink channel based on the SRS; and
determining a target channel based on the first uplink channel and the power adjustment factor used by the first antenna ports, wherein the target channel is a target uplink channel or a target downlink channel, wherein determining the target channel comprises:
computing the target channel based on the first uplink channel, the power adjustment factor used by the target antenna port, and the ratio.

10. The access network device according to claim 9, wherein a quantity of antennas for sending a data signal by the terminal is less than a quantity of antennas for receiving a data signal, the target channel is the target uplink channel, and the SRS comprises a first SRS sent by the terminal device by using the first antenna ports; and
wherein the at least one processor is further configured to:
determine the first uplink channel based on the first SRS.

11. The access network device according to claim 10, wherein the SRS further comprises a second SRS sent by the terminal device by using a second antenna port, and the second antenna port is an antenna port not used by the terminal device to send a data signal; and
the at least one processor is further configured to:
determine a second uplink channel based on the second SRS; and
compute the target downlink channel based on the first uplink channel and the second uplink channel.

12. The access network device according to claim 9, wherein a quantity of antennas for sending a data signal by the terminal is less than a quantity of antennas for receiving a data signal, the target channel is the target downlink channel, the SRS comprises a first SRS sent by the terminal device by using the first antenna ports and a second SRS sent by the terminal device by using a second antenna port, and the second antenna port is an antenna port not used by the terminal device to send a data signal; and
wherein the first uplink channel comprises a second uplink channel and a third uplink channel, and the at least one processor is configured to:
determine the second uplink channel based on the first SRS;
determine the third uplink channel based on the second SRS;
determine a fourth uplink channel based on the second uplink channel and the power adjustment factor used by the first antenna ports; and
determine the target downlink channel based on the third uplink channel and the fourth uplink channel.

13. The access network device according to claim 12, wherein the at least one processor is further configured to:
determine the second uplink channel as the target uplink channel.

14. The access network device according to claim 12, wherein the at least one processor is configured to:
determine the fourth uplink channel based on the second uplink channel, the power adjustment factor used by the target antenna port, and the ratio.

15. The access network device according to claim 9, wherein a quantity of antennas for sending a data signal by the terminal is equal to a quantity of antennas for receiving a data signal, the target channel is the target downlink channel, and the SRS comprises a first SRS sent by the terminal device by using the first antenna ports; and
wherein determining the first uplink channel based on the SRS comprises:
determining the first uplink channel based on the first SRS; and
wherein determining the target channel based on the first uplink channel and the power adjustment factor used by the first antenna ports comprises:
determining a fifth uplink channel based on the first uplink channel and the power adjustment factor used by the first antenna ports; and
determining the target downlink channel based on the fifth uplink channel.

16. The access network device according to claim 15, wherein
determining the fifth uplink channel based on the first uplink channel and the power adjustment factor used by the first antenna ports comprises:
determining the fifth uplink channel based on the first uplink channel, the power adjustment factor used by the target antenna port, and the ratio.

* * * * *